United States Patent [19]

Kurokawa

[11] Patent Number: 4,678,409
[45] Date of Patent: Jul. 7, 1987

[54] MULTIPLE MAGNETIC PUMP SYSTEM

[75] Inventor: Toshio Kurokawa, Kanagawa, Japan

[73] Assignee: Fuji Photo Film Co., Ltd., Kanagawa, Japan

[21] Appl. No.: 799,770

[22] Filed: Nov. 21, 1985

[30] Foreign Application Priority Data

Nov. 22, 1984 [JP] Japan .................. 59-178060[U]
Aug. 22, 1985 [JP] Japan .................. 60-128151[U]

[51] Int. Cl.$^4$ .............................................. F04B 17/00
[52] U.S. Cl. ................................. 417/420; 417/423 R
[58] Field of Search .................. 417/420, 423 R, 360; 415/DIG. 3, 198.1; 416/3; 310/104

[56] References Cited

U.S. PATENT DOCUMENTS 3,203,352 8/1965 Schafranek .................. 417/423 R

FOREIGN PATENT DOCUMENTS 1165144 3/1964 Fed. Rep. of Germany ...... 417/420
2534740 2/1977 Fed. Rep. of Germany ...... 417/420
2950046 6/1981 Fed. Rep. of Germany ...... 417/420
62990 4/1982 Japan ............................. 417/420
65594 5/1913 Switzerland ................... 417/420

Primary Examiner—Carlton R. Croyle
Assistant Examiner—Donald E. Stout
Attorney, Agent, or Firm—Sughrue, Mion, Zinn, Macpeak and Seas

[57] ABSTRACT

A multiple magnetic pump system comprises a plurality of pump chambers; a pair of inlet and outlet ports provided in each of the pump chambers; an impeller rotatably supported in each of the pump chambers and having a driven magnetic material; and a driving magnetic material connected to a driving source so as to drive the impeller via the driven magnetic material. There is provided a single driving shaft of the driving source, and each of the pump chambers has a tubular member which defines a through hole therein and partitions the through hole from the pump chamber so as to allow the single driving shaft to be inserted into each of the through hole of the plurality of casings. The impeller is rotatably mounted on each of the tubular members.

9 Claims, 10 Drawing Figures

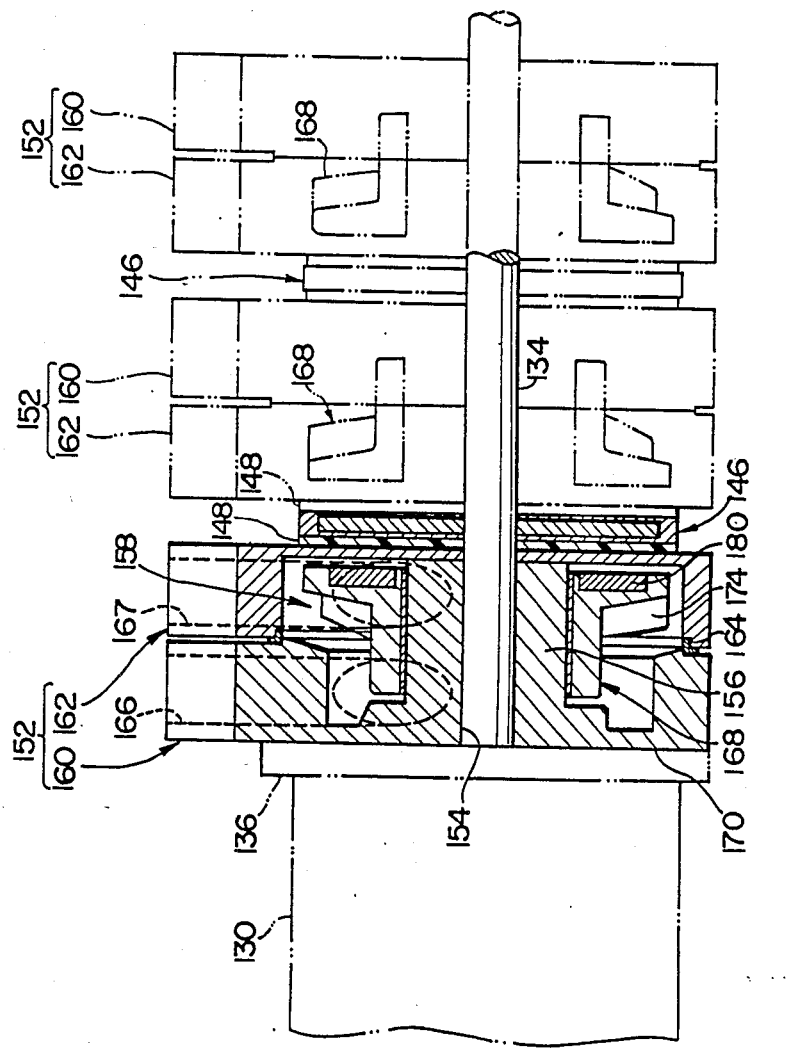

4,678,409

MULTIPLE MAGNETIC PUMP SYSTEM

BACKGROUND OF THE INVENTION

1. Field of the Invention

The present invention relates to a multiple magnetic pump system in which driving force is magnetically transmitted to an impeller.

2. Description of the Related Art

FIGS. 1 and 2 show in combination a conventional magnetic pump 10, disclosed in, for example, Japanese Utility Model Publication No. 20340/1970, which is employed to pump a processing liquid used in a photographic developing apparatus.

The pump 10 is arranged such that a driving magnetic material 16 which is secured to a driving shaft 14 of a motor 12 rotates around the outer periphery of a partition tubular member 15 provided in a casing 26 to drive a driven magnetic material member 20 buried in an impeller 18 located in a pump chamber 17 so that the impeller 18 is rotated. A lubricating member 19 which also serves as a spacer is disposed between the outer periphery of the impeller 18 at which the driven magnetic material member 20 is positioned and the inner periphery of the tubular member 15 for the purpose of enabling the impeller 18 to rotate smoothly. The rotation of the impeller 18 causes a processing liquid to be sucked in from an inlet port 22 provided on the prolongation of the axis of the driving shaft 14, the processing liquid then being discharged from an outlet port 24 by means of centrifugal force.

In the pump 10 having such a structure, the motor 12 and the pump chamber 17 are shut off from each other by the tubular member 15 provided in the casing 26 so that no processing liquid in the pump chamber 17 leaks out.

Since a photographic developing apparatus is generally provided with a plurality of processing tanks for containing, for example, a developer, a fixer, water for rinsing and so forth, it is necessasry to provide a number of pumps 10 corresponding to the number of the processing tanks. In the pump 10 with the above-described structure, however, the inlet port 22 is provided on the prolongation of the axis of the driving shaft 14 of the motor 12, and this permits only one pump 10 to be provided for a single motor 12. Accordingly, it is necessary to provide a number of motors 12 corresponding to the number of required pumps 10.

SUMMARY OF THE INVENTION

In view of the above circumstances, it is a primary object of the present invention to provide a multiple magnetic pump system which is so designed that a plurality of pumps can be activated by the operation of a single motor.

According to the present invention, the above object can be accomplished by a multiple magnetic pump system comprising: a plurality of casings each defining a pump chamber; a pair of inlet and outlet ports provided in the pump chamber; an impeller rotatably supported in the pump chamber and having a driven magnetic material member; and a driving magnetic material member connected to a driving source so as to drive the impeller via the driven magnetic material member, characterized in that there is provided a single driving shaft of the driving source, that each pump chamber has a tubular member which defines a through hole therein and partitions the through hole from the pump chamber so as to allow the single driving shaft to be inserted into each through hole of the plurality of casings, and that the impeller is rotatably mounted on each tubular member.

In the above arrangement, the respective through holes of the plurality of casings are aligned on the same axis. Thus, it is possible for all the driving magnetic material members disposed on the same axis to transmit driving force to the corresponding driven magnetic material members diposed in the respective pump chambers defined inside the casings.

Since the driven magnetic material members are provided on the respective impellers, the driving magnetic material members cause the corresponding impellers to rotate via the driven magnetic material members. In consequence, centrifugal force is produced in each pump chamber. This centrifugal force causes each processing liquid to be sucked in from the inlet port of the corresponding pump and discharged from the outlet port.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which:

FIG. 10 is a sectional view taken along the line X—X of FIG. 9.

DETAILED DESCRIPTION OF THE PREFERRED EMBODIMENTS

Figure 1:
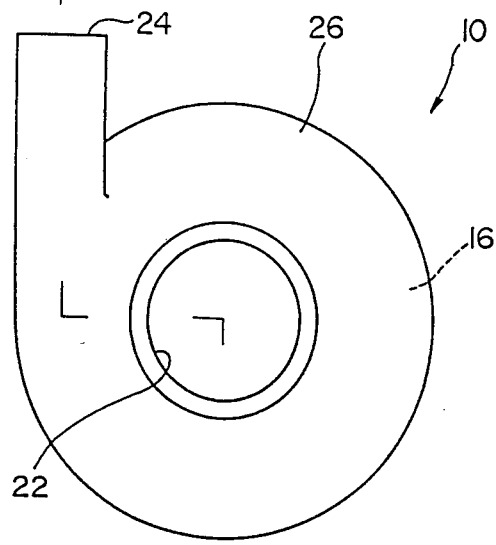
FIG. 1 is a front elevational view of a conventional magnetic pump.
Figure 2:
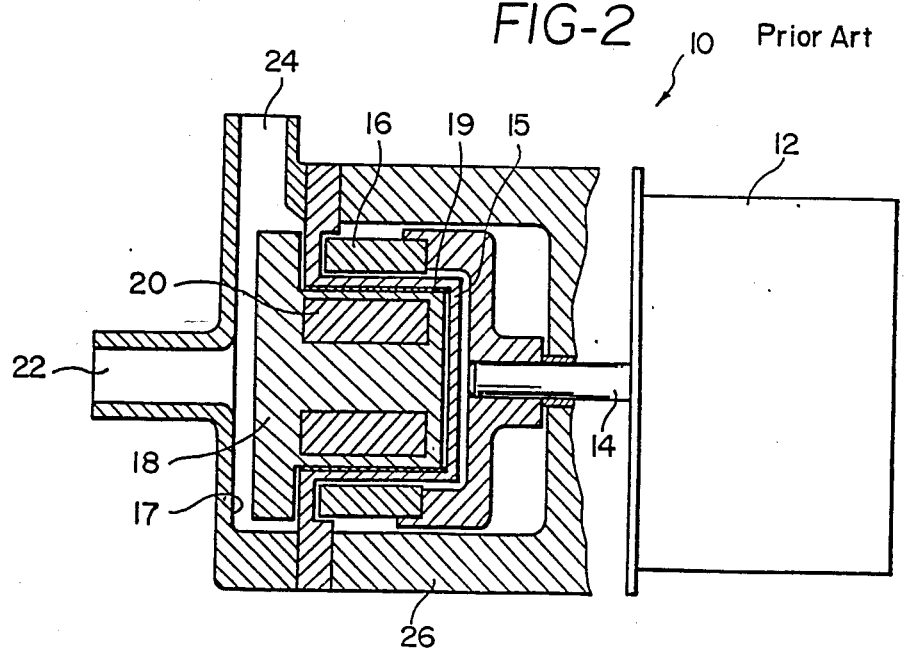
FIG. 2 is a sectional view taken along the line II—II of FIG. 1.
Figure 3:
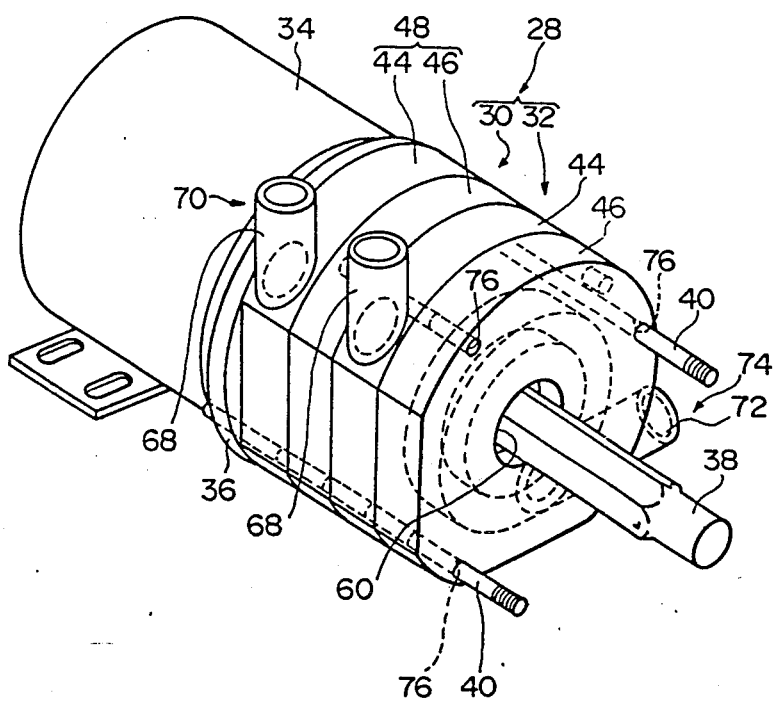
FIG. 3 is a perspective view of a first embodiment of the multiple magnetic pump system according to the present invention.
Figure 4:
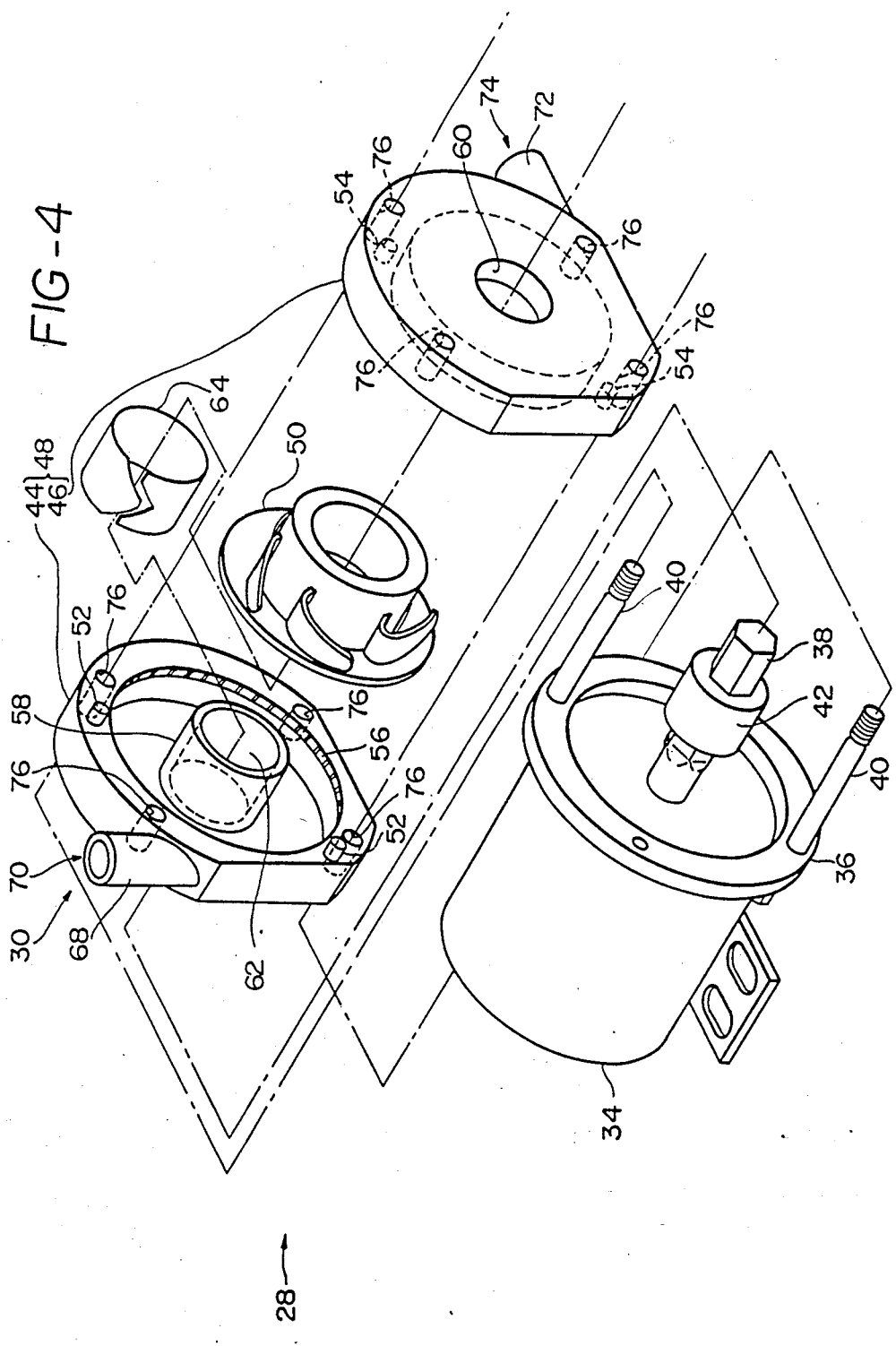
FIG. 4 is an exploded perspective view of the motor and the first pump employed in the first embodiment.

FIGS. 3 and 4 show in combination a multiple magnetic pump system 28 in accordance with a first embodiment of the present invention.

The multiple magnetic pump system 28 includes a plurality of pumps, including first and second pumps 30 and 32, which are operably connectable to a motor 34. It is to be noted that the second pump 32 is not shown in FIG. 4.

A ring-shaped flange 36 is secured to the motor 34 so that the center of the flange 36 coincides with the axis of a driving shaft 38 of the motor 34. Four parallel relatively long bolts 40 (two of them are not shown) project from the flange 36 for the purpose of mounting the pumps 30 and 32. A driving magnetic material member 42 is rigidly fitted on the driving shaft 38 of the motor 34.

The first pump 30 has a casing 48 formed from a base member 44 and a cover member 46, and an impeller 50. The base member 44 and the cover member 46 are each made of a plastic material and formed such as to have a dish-like configuration. The base and cover members 44 and 46 are connected together so that their respective indented sides face each other, whereby a pump chamber 51 (see FIG. 6) is defined inside the casing 48. When the base and cover members 44 and 46 are connected together, two pins 52 provided on the base member 44 are respectively fitted into two pin receiving holes 54 provided in the cover member 46, whereby the base and cover members 44 and 46 are accurately positioned relative to each other. Further, an O-ring 56 formed of an elastic material is disposed at a part of the area of contact between the respective abutment surfaces of the base and cover members 44 and 46 so that the airtightness of the interior of the pump chamber 51 is enhanced.

A thin-walled tubular member 58 is provided at the axial center of the base member 44 so as to project toward the cover member 46. A circular bore 60 having an inside diameter substantially equal to the inside diameter of the tubular member 58 is provided at the axial center of the cover member 46. Thus, when the base and cover members 44 and 46 are connected together, a through hole 62 is defined by the tubular member 58 and the circular bore 60, the through hole 62 being partitioned from the pump chamber 51. The tubular member 58 is integrally molded with the base member 44. The distal end portion of the tubular member 58 is fitted into a ring-shaped groove (not shown) provided along the circumference of the circular bore 60 of the cover member 46, whereby the through hole 62 and the pump chamber 51 is isolated from each other.

The impeller 50 is disposed on the outer periphery of the tubular member 58, that is, within the pump chamber 51, through a lubricating member 64 for enabling the impeller 50 to rotate smoothly. The lubricating member 64 is formed from a thin sheet of a synthetic resin such as Teflon and is bent in a cylindrical shape when disposed between the outer periphery of the tubular member 58 and the inner periphery of the impeller 50. A driven magnetic material member 66 is buried in the impeller 50 (see FIG. 6) so as to receive driving force from the driving magnetic material 42 member. The impeller 50 is rotated by the driving force transmitted thereto via the driven magnetic material member 42, thus causing centrifugal force within the pump chamber 51.

Figure 5:
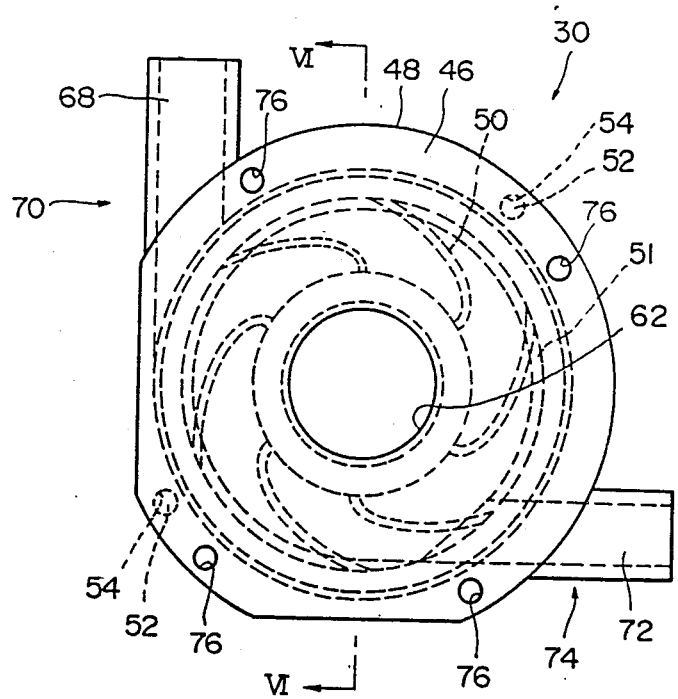
FIG. 5 is a front elevational view of the first embodiment of the multiple magnetic pump system according to the present invention.
Figure 6:
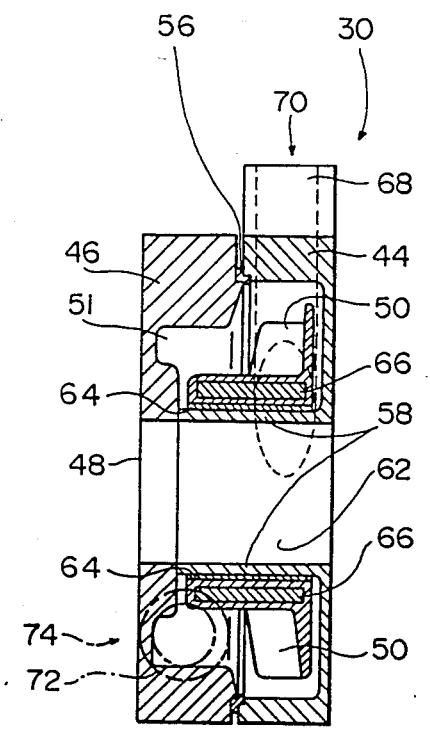
FIG. 6 is a sectional view taken along the line VI—VI of FIG. 5.

As also shown in FIGS. 5 and 6, a first communicating pipe 68 which is communicated with the pump chamber 51 is connecting to the base member 44 so as to extend tagentially with respect to the pump chamber 51, thereby providing an outlet port 70. A second communicating pipe 72 which is communicated with the pump chamber 51 is connected to the cover member 46 so as to extend tangentially with respect to the pump chamber 51, thereby providing an inlet port 74.

Four bores 76 are provided in the peripheral wall of the casing 48 defined by the respective peripheral walls of the base and cover members 44 and 46 when connected together. The aforementioned bolts 40 are respectively inserted into these bores 76, whereby the respective through holes of the first and second pumps 30 and 32 can be disposed on the same axis, and the first and second pumps 30 and 32 are secured to the flange 36 by means of the bolts 40 and nuts (not shown).

If the length of the bolts 40 is increased, it becomes possible to mount a correspondingly increased number of pumps.

The following is a description of the operation of the above-described embodiment.

Although the multiple magnetic pump system in accordance with this embodiment has two pumps, that is, the first and second pumps 30 and 32, the operation of the first pump 30 alone will be described hereinunder.

As the motor 34 rotates, the driving magnetic material member 42 provided on the driving shaft 38 rotates. Since the driving magnetic material member 42 is inserted into the through hole 62 of the casing 48, the driving force from the driving shaft 38 is magnetically transmitted to the driven magnetic material member 66 located within the pump chamber 51, thus causing the impeller 50 to rotate inductively. The rotation of the impeller 50 generates centrifugal force in the liquid within the pump chamber 51, and this causes new liquid to be sucked into the pump chamber 51 from the inlet port 74. The liquid within the pump chamber 51 is centrifugally accelerated and delivered toward the outlet port 70 along the inner peripheral wall of the pump chamber 51. Since the outlet port 70 is provided so as to be tangential with respect to the pump chamber 51, the liquid is smoothly discharged from the outlet port 70 by means of the centrifugal force.

Accordingly, the impeller 50 in the pump chamber 51 continuously rotates in response to the rotation of the motor 36, and the liquid is thereby continuously pumped in and out by means of the centrifugal force.

If a plurality of pumps, including the second pump 32 with the same configuration as the first pump 30, are disposed so that the respective through holes 62 are aligned on the same axis, it is possible to produce centrifugal force in the liquid within each pump chamber 51 by means of the driving force transmitted from the driving magnetic material member 42. In this case, it is preferable to additionally provide driving magnetic material members 42 on the driving shaft 38 in correspondence with the number of added pumps.

It is to be noted that since each driving magnetic material member 42 and the corresponding pump chamber 51 are partitioned from each other by the associated tubular member 58 and driving force is magnetically transmitted, there is no risk of the liquid within the pump chamber 51 leaking out. As has been described above, the multiple magnetic pump system according to the present invention includes a plurality of casings each provided with a through hole which allows a driving magnetic material member to be inserted thereinto, so that it is possible to activate a plurality of pumps by the operation of a single motor.

Figure 7:
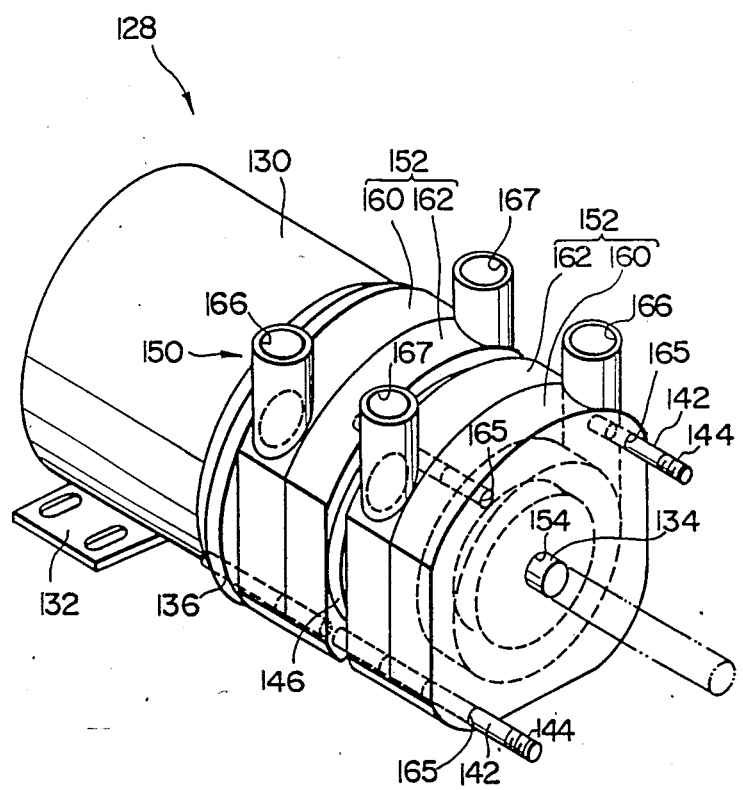
FIG. 7 is a perspective view of a second embodiment of the multiple magnetic pump system according to the present invention.

Referring next to FIG. 7, there is shown a multiple magnetic pump system 128 in accordance with a second embodiment of the present invention in which two magnetic pumps are provided for one driving magnetic material member.

The multiple magnetic pump system 128 includes a motor 130 which serves as a driving means and which has a flange 132 secured to the outer periphery thereof. The motor 130 is secured to a given base by rigidly fastening the flange 132 to the base by bolts or other fastening means (not shown). A ring-shaped flange 136 is secured to the end face of the motor 130 on the side thereof from which a driving shaft 134 projects. The center of the flange 136 is coincident with the axis of the driving shaft 134.

Figure 8:
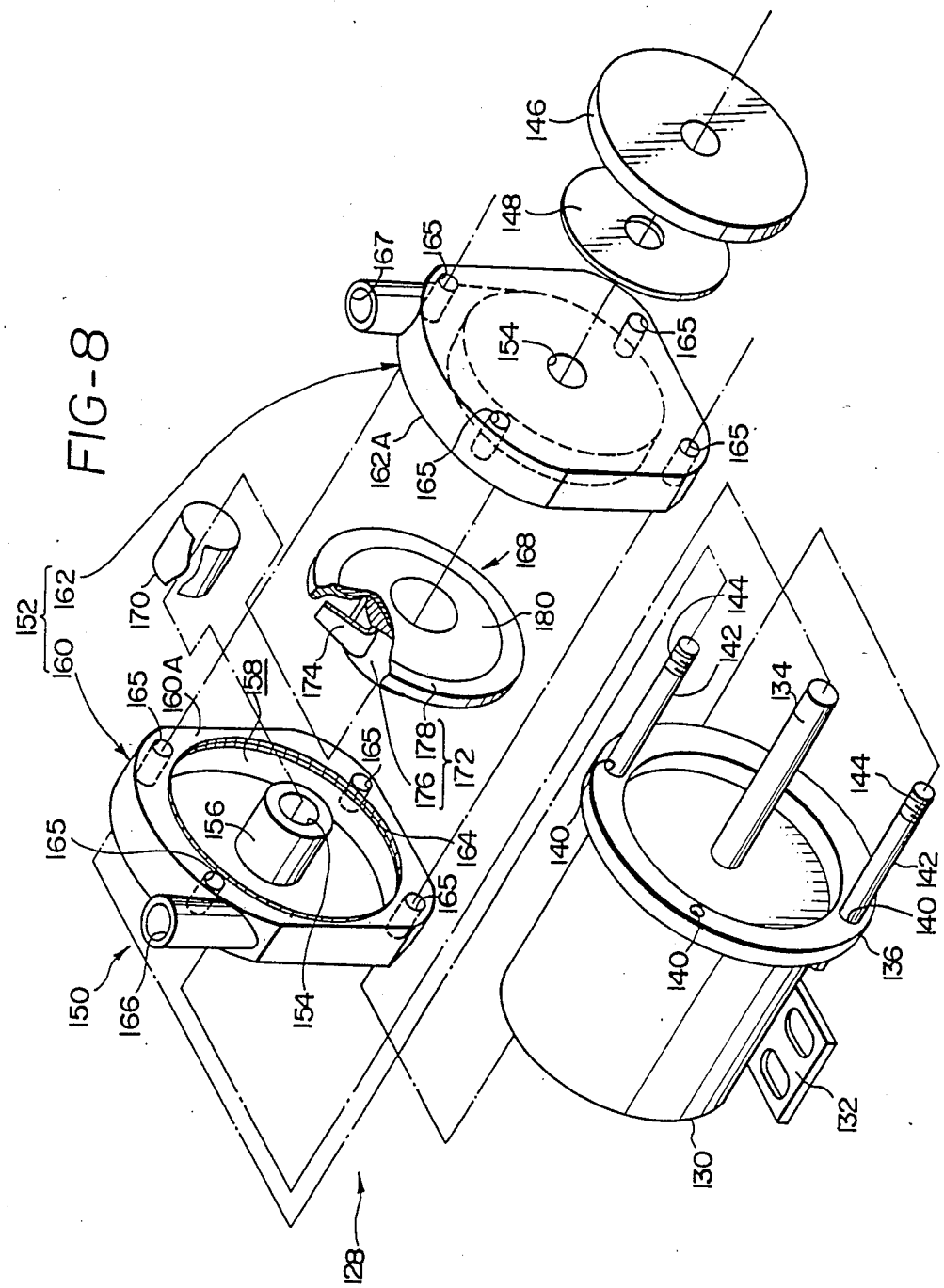
FIG. 8 is an exploded perspective view of the second embodiment shown in FIG. 7.
Figure 9:
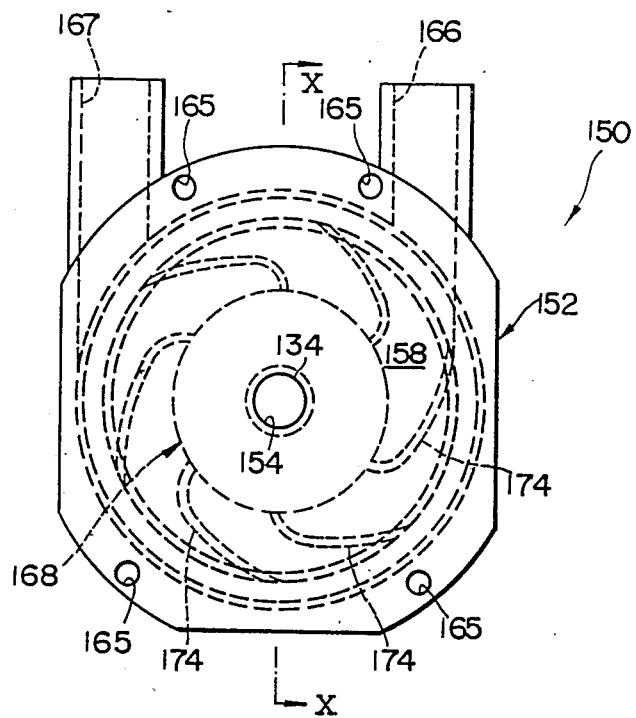
FIG. 9 is a front elevational view of the second embodiment of the multiple magnetic pump system according to the present invention.

As shown in FIG. 8, four through holes 140 are provided in the flange 136 so as to extend from one end face to the other end of the flange 136. One of each of the relatively long bolts 142 is fitted into the corresponding through hole 140. An external thread 144 is formed on the other end portion of each of the bolts 142. A disk-shaped driving magnet 146 which serves as a driving magnetic material member is rigidly fitted on the longitudinally central portion of the driving shaft 134 of the motor 130. In consequence, as the driving shaft 134 of the motor 130 rotates, the driving magnet 146 rotates together with the driving shaft 134 in one unit. Thin-walled spacers 148 made of a material with a relatively low coefficient of friction are respectively disposed on both faces of the driving magnet 146. Two magnetic pumps 150 are respectively installed on both sides of the driving magnet 146 across the corresponding spacers 148. It is to be noted that FIG. 8 shows only the spacer 148 and the magnetic pump 150 on the left-hand side of the driving magnet 146, and the spacer 148 and the magnetic pump 150 on the right-hand side of the magnet 146 are not shown for the purpose of simplifying the illustration.

Each of the magnetic pumps 150 has a casing 152 composed of a base member 160 and a cover member 162. The respective peripheral edges 160A and 162A of the members 160 and 162 on their indented sides are brought into close contact with each other so that a pump chamber 158 is defined inside the casing 152. A circular bore 154 is provided in the center of the cover member 162 of the casing 152. A tubular member 156 is provided at the center of the base member 160, that is, on the same axis as the bore 154, so as to project toward the cover member 162. Thus, one through hole is defined by the tubular member 156 and the bore 154 when connected together, and the driving shaft 134 extends through this through hole. The pump chamber 158 is isolated from the through hole by the tubular member 156.

An O-ring 164 is disposed in the area of the contact between the peripheral edge 160A of the base member 160 and the peripheral edge 162A of the cover member 162. The distal end portion of the tubular member 156, which is integrally formed with the base member 160, is fitted into a groove (not shown) formed in the cover member 162, whereby the pump chamber 158 is hermetically sealed.

Each of the peripheral edges 160A and 162A has a relatively large wall thickness and is provided with circular bores 165 for respectively receiving the bolts 142. More specifically, a plurality of magnetic pumps 150 are integrally secured to the motor 130 in such a manner that the driving shaft 134 of the motor 130 is rotatably inserted into the respective through holes of the casings 152 of the pumps 150, while the bolts 142 are inserted into the respective bores 165, and the nuts (not shown) are screwed onto the external threads 144.

Through holes are respectively provided in the outer peripheries of the base and cover members 160 and 162, and tubular pieces are formed at the respective through holes so as to project tangentially with respect to the pump chamber 158, thereby providing an outlet port 166 and an inlet port 167, respectively, for a processing liquid.

An impeller 168 is disposed within the pump chamber 158 and is rotatably supported by the outer periphery of the tubular member 156 through a lubricating member 170 for allowing the impeller 168 to rotate smoothly. The lubricating member 170 is formed from a thin sheet of a synthetic resin such as Teflon and is bent in a cylindrical shape when disposed beween the outer periphery of the tubular member 156 and the inner periphery of the impeller 168. The impeller 168 has a rotary base 172 and a plurality of vanes 174, described hereinafter. The rotary base 172 is composed of a tubular portion 176 rotatably supported on the outer periphery of the tubular member 156, and a disk portion 178 integrally secured to one end face of the tubular portion 176. The rotary base 172 is so disposed that the disk portion 178 faces the driving magnet 146 across the side wall of the cover member 162. A disk-shaped driven magnet 180 which serves as a driven magnetic material is buried in the disk portion 178. The driven magnet 180 is magnetically rotated in response to the rotation of the driving magnet 146.

One end of each of a plurality of vanes 174 extending radially of the tubular portion 176 is secured to the outer periphery of the tubular portion 176 at equal spacings. The intermediate portion of each vane 174 is circularly bent and has a width gradually reduced toward the distal end of the vane 174. One lateral edge of each vane 174 is secured to the disk portion 178.

When the impeller 168, formed as described above, is rotated by virtue of the magnetic attraction force acting between the driving magnet 146 and the driven magnet 180, centrifugal force is generated in the processing liquid within the pump chamber 158. In other words, in response to the rotation of the impeller 168, new processing liquid is sucked in from the inlet port 167 and is delivered to the outlet port 166 along the inner peripheral wall of the pump chamber 158.

In this embodiment, two magnetic pumps 150 are disposed so as to respectively face both end faces of the driving magnet 146, and the disk portion 178 of the impeller 168 of each pump 150 is disposed on the side of the pump 150 which is closer to the driving magnet 146. It is therefore possible for the two magnetic pumps 150 to be simultaneously driven by the operation of a single driving magnet 146.

The following is a description of the operation of the second embodiment.

As the driving shaft 134 of the motor 130 rotates, the driving magnet 146 rotates. Since the spacer 148 with a relatively small coefficient of friction is disposed between the driving magnet 146 and the casing 152 of each pump 150, the driving magnet 146 can rotate smoothly.

The impellers 168 are rotatably supported on the respective tubular members 156 within the pump chambers 158 of the two magnetic pumps 150 so that the disk portions 178 face the driving magnet 146. Accordingly, the driving magnet 146 can apply magnetic attraction force to both the driven magnets 180, so that the driving force from the driving shaft 134 can be transmitted to the two impellers 168.

Each impeller 168 is smoothly rotated by virtue of the corresponding lubricating member 170, and the rotation of the impeller 168 causes centrifugal force to be generated in the pump chamber 158. This centrifugal force causes new processing liquid to be sucked in from the inlet port 167 and delivered to the outlet port 166 along the inner peripheral surface of the pump chamber 158.

Since the outlet port 166 is extended tangentially with respect to the inner peripheral surface of the pump chamber 156 and in the direction of the flow of the processing liquid, the liquid is smoothly discharged. In other words, when the impeller 168 continuously rotates in response to the rotation of the driving shaft 134, the processing liquid is continuously pumped in and out.

Further, the pump chamber 158 through which the processing liquid passes is hermetically sealed except for the outlet port 166 and the inlet port 167 by employing the O-ring 164 or the like which seals the joint between the base and cover members 160 and 162, and the impeller 168 in each pump chamber 158 is magnetically rotated. There is therefore no risk of the processing liquid leaking out from the pump chamber 158. In addition, since the processing liquid is isolated from the driving shaft 134 and the motor 130, there is no adverse effect on the processing liquid.

Further, in this embodiment, the driving magnetic pump disposed so as to face the end face of the magnetic pump 150. Accordingly, unlike the first embodiment in which a driven magnet is buried in the tubular portion 176 and a driving magent is disposed in the through hole, it is possible according to the second embodiment to carry the driving shaft 134 in such a manner that it is rotatably supported directly by the through hole. It is therefore possible to reduce the diameter of the driving shaft 134.

Although in this embodiment two magnetic pumps 150 are provided for on driving magnet 146 and disposed so as to respectively face both end faces of this driving magnet 146, three or more magnetic pumps 150 may be provided. In such a case, as shown by the imaginary line in FIG. 10, another driving magnet is additionally disposed between the second and third magnetic pumps, and the driven magnet 80 of the impeller 168 of the third magnetic pump is disposed so as to face the second driving magnet.

Alternatively, another set of the multiple magnetic pump system such as that shown in FIG. 8 in which two magnetic pumps are provided for one driving magnet may be mounted on an extended driving shaft.

Further, the outlet and inlet ports 166 and 167 may be provided at any position on the outer periphery of the casing 152.

What is claimed is:

1. A multiple magnetic pump system comprising:
   a single rotatable driving shaft of a driving source;
   a plurality of casings each defining a pump chamber;
   each of said casings comprising a pair of oppositely directed bowl bodies sealably connected to each other at their peripheries to form a pump chamber therebetween, one of said bowl bodies of said pair including an integral tubular member extending from a central portion thereof toward the other bowl body, said other bowl body having a hole at its center and said tubular member at its end remote from the central portion of said one bowl body being sealably coupled to the central portion of said other bowl body at said hole such that said tubular member of said one bowl body and said hole within the center of said other bowl body define a through hole, means for connecting said plurality of casings as an axial array with the through holes for said casings being axially aligned, said tubular member defining an axial through hole therein and partitioning said through hole from said pump chamber so as to allow said driving shaft to be insertably received within said through holes of said plurality of casings;
   at least one driving magnetic material member connected to said driving shaft,
   an impeller rotatably mounted on each tubular member in said each pump chamber;
   a driven magnetic material member connected to each impeller and receiving a magnetic force from said driving magnetic material member so that said impeller is rotated by a rotation of said driving shaft; and
   a pair of inlet and outlet ports provided in each said pump chamber.

2. A multiple magnetic pump system according to claim 1, wherein said driving magnetic material member is of cylindrical shape and said driving magnetic material member is fixed concentrically on said driving shaft.

3. A multiple magnetic pump system according to claim 2, wherein said driven magnetic material member is embedded into a journal portion of said impeller, which is disposed in a diametrically opposed position to said driving magnetic material member via said tubular member.

4. A multiple magnetic pump system according to claim 1, wherein said single driving shaft is extended so as to support said plurality of casings in series thereon.

5. A multiple magnetic pump system according to claim 4, wherein said driving magnetic material member is provided on said driving shaft for each of said casings.

6. A multiple magnetic pump system according to claim 1, wherein said pair of inlet and outlet ports in said pump chamber are oriented in a tangential direction of said pump chamber.

7. A multiple magnetic pump system according to claim 1, wherein said driving source is an electric motor.

8. A multiple magnetic pump system comprising:
   an electric motor having a single rotatable driving shaft;
   a plurality of end to end connected casings, each casing comprising a pair of oppositely facing bowl bodies connected to each other at their perpheries so as to define a pump chamber therebetween and supported about said driving shaft in series;
   a tubular member in each said pump chamber extending integrally from a central portion of one of said bowl bodies to a central portion of the other bowl body, and said other bowl body having a circular hole within said central portion thereof so as to define with said tubular member an axial through hole into which said driving shaft is insertably received, said tubular member partitioning said through hole from said pump chamber;
   at least one driving magnetic material member formed into a cylindrical shape and fixed on said driving shaft;
   an impeller rotatably mounted at its journal portion on each said tubular member in each said pump chamber;
   a driven magnetic material member embedded in said journal portion of each said impeller and disposed in a diametrically opposed position to said driving magnetic material member via said tubular member so that said impeller is rotated by rotation of said driving shaft; and
   a pair of inlet and outlet ports provided in each said pump chamber and oriented in a tangential direction of said pump chamber.

9. A multiple magnetic pump system comprising:

an electric motor having a single rotatable driving shaft;

a ring-shaped flange secured to said motor with its axis coinciding with the axis of said motor driving shaft, a plurality of bolts fixed to and projecting from the flange parallel to said driving shaft, a plurality of end to end abutting casings forming annular pump chambers therein, holes projecting through said casings aligned with said bolts and receiving said bolts, means within said casings for forming axial through holes for receiving said driving shaft and forming a pump chamber within each casing sealed off from said through hole bearing said driving shaft;

an impeller rotatably mounted within said pump chamer;

a driven magnetic material member borne by said impeller;

a driving magnetic material member mounted to said driving shaft and rotatable therewith; and a pair of inlet and outlet ports provided in each said pump chamber and oriented in a tangential direction and wherein, each of said casings comprise a pair of oppositely facing bowl bodies connected to each other at their peripheries so as to define a pump chamber therebetween and wherein a pair of oppositely facing bowl bodies are provided with holes at locations corresponding to said circumferentially spaced parallel bolt thereby aligning all of said pumps commonly about a single axis while sealing said oppositely facing bowl bodies at their perpheries, so as to form a sealed pump chamber between said oppositely facing bowl bodies and wherein a pair of bowl bodies for said casings include an alignment pin fixedly mounted to one of said bowl bodies and projecting outwardly thereof and a similar sized alignment hole formed within the other of said bowl bodies and receiving said projecting pin for aligning said bowl bodies and facilitating their peripheral engagement therebetween to complete the seal between the bowl bodies for said pump chamber defined thereby.

* * * * *